(12) United States Patent
Kurihara (10) Patent No.: US 11,967,682 B2
(45) Date of Patent: Apr. 23, 2024

(54) BATTERY PACK WITH COUPLED BATTERY BLOCKS

(71) Applicant: SANYO Electric Co., Ltd., Osaka (JP)

(72) Inventor: Hidemi Kurihara, Osaka (JP)

(73) Assignee: PANASONIC ENERGY CO., LTD., Osaka (JP)

(*) Notice: Subject to any disclaimer, the term of this patent is extended or adjusted under 35 U.S.C. 154(b) by 147 days.

(21) Appl. No.: 17/048,177

(22) PCT Filed: Apr. 10, 2019

(86) PCT No.: PCT/JP2019/015581
§ 371 (c)(1),
(2) Date: Oct. 16, 2020

(87) PCT Pub. No.: WO2019/208218
PCT Pub. Date: Oct. 31, 2019

(65) Prior Publication Data
US 2021/0159549 A1    May 27, 2021

(30) Foreign Application Priority Data

Apr. 25, 2018  (JP) ................. 2018-084554

(51) Int. Cl.
*H01M 10/42* (2006.01)
*H01M 10/04* (2006.01)
(Continued)

(52) U.S. Cl.
CPC ..... *H01M 10/425* (2013.01); *H01M 10/0422* (2013.01); *H01M 50/204* (2021.01);
(Continued)

(58) Field of Classification Search
CPC .......... H01M 10/425; H01M 10/0422; H01M 50/204; H01M 50/502; H01M 50/519;
(Continued)

(56) References Cited

U.S. PATENT DOCUMENTS

2008/0220320 A1   9/2008  Horikoshi et al.
2008/0305390 A1   12/2008 Naito
(Continued)

FOREIGN PATENT DOCUMENTS

EP        2343752 A2 *  7/2011  ............. H01M 2/04
JP        2005-317460       11/2005
(Continued)

OTHER PUBLICATIONS

Machine translation of JP 2005317460A, Toya et al., 2005 (Year: 2005).*

(Continued)

*Primary Examiner* — Robert S Carrico
(74) *Attorney, Agent, or Firm* — WHDA, LLP (57) ABSTRACT

Battery block is battery block that includes: a plurality of battery blocks in which a plurality of battery cells is arranged by holder at fixed positions and the battery cells are connected by lead plate; and circuit board that fixes battery blocks. Battery blocks have terminal parts to be connected to circuit board at the same position. Circuit board has connection parts to be connected to terminal parts of battery blocks. By coupling terminal parts of battery blocks to connection parts of circuit board, battery blocks are connected in series or in parallel, and battery blocks are coupled via circuit board.

11 Claims, 8 Drawing Sheets

(51) Int. Cl.
  *H01M 50/204* (2021.01)
  *H01M 50/213* (2021.01)
  *H01M 50/296* (2021.01)
  *H01M 50/50* (2021.01)
  *H01M 50/502* (2021.01)
  *H01M 50/519* (2021.01)
  *H01M 50/569* (2021.01)

(52) U.S. Cl.
  CPC ....... *H01M 50/213* (2021.01); *H01M 50/296* (2021.01); *H01M 50/50* (2021.01); *H01M 50/502* (2021.01); *H01M 50/569* (2021.01); *H01M 50/519* (2021.01)

(58) Field of Classification Search
  CPC ............. H01M 50/569; H01M 50/213; H01M 50/289; H01M 2220/30; H01M 50/247; H01M 50/296; H01M 50/50; H01M 50/284; Y02P 70/50; Y02E 60/10
  See application file for complete search history.

(56) References Cited

U.S. PATENT DOCUMENTS

| | | | | |
|---|---|---|---|---|
| 2009/0068880 | A1* | 3/2009 | Ebine | H01R 13/405 439/500 |
| 2010/0052692 | A1* | 3/2010 | Yano | H01M 50/317 324/427 |
| 2018/0183247 | A1* | 6/2018 | Yamauchi | H02J 7/00304 |

FOREIGN PATENT DOCUMENTS

| | | | | |
|---|---|---|---|---|
| JP | 2005317460 A | * | 11/2005 | ............. H01M 2/10 |
| JP | 2008-218210 | | 9/2008 | |
| JP | 2008-287991 | | 11/2008 | |
| JP | 2011-249251 | | 12/2011 | |

OTHER PUBLICATIONS

International Search Report of PCT application No. PCT/JP2019/015581 dated Jun. 18, 2019.

* cited by examiner

BATTERY PACK WITH COUPLED BATTERY BLOCKS

CROSS-REFERENCE TO RELATED APPLICATIONS

This application is a U.S. national stage application of the PCT International Application No. PCT/JP2019/015581 filed on Apr. 10, 2019, which claims the benefit of foreign priority of Japanese patent application No. 2018-084554 filed on Apr. 25, 2018, the contents all of which are incorporated herein by reference.

TECHNICAL FIELD

The present invention relates to a battery pack containing a large number of battery cells, and in particular, to a battery pack in which a plurality of battery cells is arranged at fixed positions by a holder and formed as a battery block, and further a plurality of battery blocks is connected in series or in parallel to achieve a high capacity.

BACKGROUND ART

A battery pack having a plurality of battery cells housed in a case is used as a power source for portable devices and cordless devices. In this battery pack, a plurality of battery cells is connected in series or in parallel to increase the capacity. In particular, in recent years, battery packs are required to increase in capacity and also decrease in size and weight from the viewpoint of portability.

The high capacity of the battery pack can be achieved by connecting a large number of battery cells in series or in parallel. In a battery pack containing a large number of battery cells, the plurality of battery cells is arranged at fixed positions by a holder and formed as a battery block, and further a plurality of battery blocks is connected to allow the large number of battery cells to be connected in series or in parallel. (See PTL 1)

CITATION LIST

Patent Literature

PTL 1: Unexamined Japanese Patent Publication No. 2008-218210

SUMMARY OF THE INVENTION

In a battery pack including a plurality of battery blocks, adjacent battery packs are electrically connected by lead plates connecting to electrode terminals of battery cells, and the battery blocks are connected in series or in parallel. Further, in this battery pack, a circuit board is connected to each battery block. The circuit board implements a protection circuit for the battery cells of each battery block. The protection circuit of the circuit board controls charging/discharging current of each battery cell to protect the battery cell and ensure safety of the battery pack. The protection circuit detects the temperatures, remaining capacities, voltages, etc. of the battery cells and controls the current.

A battery pack including a plurality of battery blocks can be manufactured by coupling the individually assembled battery blocks. In addition, the total charge/discharge capacity can be adjusted by a number of battery blocks so that the battery pack can be mass-produced efficiently for a wide variety of uses. However, the conventional battery pack has a drawback that the battery blocks cannot be commonized and mass-produced inexpensively because the adjacent battery blocks are connected and coupled in series or in parallel by the lead plates.

The present invention was developed to eliminate the above drawback. An object thereof is to inexpensively mass-produce a battery block having a plurality of battery cells arranged at fixed positions and provide a battery pack that can achieve an optimum capacity for various purposes.

Solution to Problem and Advantageous Effect of Invention

A battery block of the present invention is a battery block that includes: a plurality of battery blocks 10 in which a plurality of battery cells 1 is arranged by holder 2 at fixed positions and battery cells 1 are connected by lead plate 3; and circuit board 4 that fixes battery blocks 10. Battery blocks 10 have terminal parts 5 to be connected to circuit board 4 at the same position. Circuit board 4 has connection parts 41 to be connected to terminal parts 5 of battery blocks 10. By coupling terminal parts 5 of battery blocks 10 to connection parts 41 of circuit board 4, battery blocks 10 are connected in series or in parallel, and battery blocks 10 are coupled via circuit board 4.

The above-mentioned battery packs are characterized in that the common battery block can be inexpensively mass-produced and the manufacturing cost can be reduced while the capacity and the shape are optimum for various uses. This is because the battery pack of the present invention is structured such that the plurality of battery blocks is electrically connected and coupled with the circuit board, the battery block each have the plurality of battery cells arranged at fixed positions by the holder and connected with the lead plates and have the terminal parts to be connected to the circuit board, arranged at the same position and commonized, and the circuit board includes the connection parts connecting the terminal parts of the battery blocks. This battery pack can be mass-produced inexpensively by commonizing the battery blocks, and the optimal capacities and shapes for various uses can be easily achieved while reducing the manufacturing cost by connecting the terminal parts of the plurality of battery blocks to the connection parts of the circuit board and connecting the battery blocks in series or in parallel via the circuit board.

Further, in the battery pack of the present invention, in order to commonize individual battery blocks 10, battery cells 1 having the same outer shape can be arranged at fixed positions by holder 2 having the same shape, and connected by lead plates 3 having the same shape. This battery pack has a feature that the battery blocks can be mass-produced extremely inexpensively because all the parts of the battery block are commonized in the same shapes.

Further, in the battery pack of the present invention, terminal parts 5 are provided on lead plates 3, terminal parts 5 are connected to circuit board 4, and battery blocks 10 can be electrically connected and coupled to circuit board 4. This battery pack has the battery blocks coupled to the circuit board via the lead plates coupled to the battery cells and thus has a characteristic that the battery blocks can be securely and firmly connected.

Further, in the battery pack of the present invention, battery blocks 10 can be coupled to connection parts 41 of circuit board 4 by soldering terminal parts 5, and this structure allows the battery blocks to be coupled while being electrically connected in a secure and stable manner.

Furthermore, in the battery pack of the present invention, terminal parts 5 of battery blocks 10 are provided with output terminals 5x of battery blocks 10 and voltage detection terminals 5y that detect voltages of battery cells 1, output terminals 5x and voltage detection terminals 5y are coupled to circuit board 4, and battery blocks 10 can be electrically connected and coupled to circuit board 4. In this battery pack, the output terminals and the voltage detection terminals are connected to the circuit board, so that the battery blocks can be firmly connected to the circuit board by a large number of terminal parts.

Further, in the battery pack of the present invention, terminal surfaces at both ends are arranged on the same plane and the plurality of battery cells 1 is arranged in a parallel posture in holders 2 of battery blocks 10, circuit board 4 is formed in a shape elongated in a longitudinal direction of battery cells 1, and the plurality of battery blocks 10 can be arranged side by side in a longitudinal direction of circuit board 4. This battery pack has a plurality of commonized battery blocks arranged side by side in the longitudinal direction, which achieves a large charge/discharge capacity in a thin shape.

In the battery pack of the present invention, battery block 10 has battery cells 1 arranged in the longitudinal direction of circuit board 4, and battery blocks 10 can be arranged side by side in the longitudinal direction on elongated circuit board 4. By arranging thin battery blocks side by side in the longitudinal direction, this battery pack can be considerably thinned as a whole and increase a charge/discharge capacity.

In the battery pack of the present invention, battery blocks 10 are provided with terminal parts 5 so as to project from fixed surface 2X facing circuit board 4, connection parts 41 of circuit board 4 are provided with through-holes 42 into which terminal parts 5 are to be inserted, and terminal parts 5 can be inserted into through-holes 42 and coupled to connection parts 41. In this battery pack, projecting terminal parts 5 can be inserted into the circuit board to reliably couple the battery blocks to the circuit board.

In the battery pack of the present invention, battery blocks 10 each have a shape with terminal parts 5 on both sides of holder 2, and terminal parts 5 on the both sides can be coupled to circuit board 4 to couple battery blocks 10 to circuit board 4. In this battery pack, by coupling both sides of the battery blocks to the circuit board, the battery block can be reliably coupled to the circuit board.

In the battery pack of the present invention, battery blocks 10 are provided with terminal parts 5 on the both sides of holder 2, terminal parts 5 on one side can be output terminals 5x, and terminal parts 5 on the other side can be voltage detection terminals 5y. Since this battery pack has the output terminals and the voltage detection terminals on the opposite sides, providing the large-current output terminals on one side of the circuit board and the small-current voltage detection terminals on the other side makes it possible to reduce harmful effects such as induced noise applied to the small-current voltage detection terminals from the large-current output terminals.

In the battery pack of the present invention, holders 2 of battery blocks 10 are provided with fitting convex parts 29 on fixed surfaces 2X facing circuit board 4, circuit board 4 is provided with fitting concave parts 43 that guide fitting convex parts 29, and battery blocks 10 can be coupled to circuit board 4 at fixed positions by guiding fitting convex parts 29 into fitting concave parts 43. In this battery pack, the battery blocks can be coupled to the circuit board at correct positions by the fitting convex parts and the fitting concave parts.

In the battery pack of the present invention, holders 2 of battery blocks 10 are integrally provided with locking hooks 30 for locking circuit board 4, and circuit board 4 is locked at locking hooks 30 with terminal parts 5 inserted into through-holes 42 of circuit board 4 so that battery blocks 10 can be easily coupled to circuit board 4 and arranged at fixed positions.

DESCRIPTION OF EMBODIMENT

Hereinafter, the present invention will be described in detail with reference to the drawings. In the following description, terms to denote specific directions or positions (e.g., "top", "bottom", and other terms including those terms) are used as necessary for easy understanding of the invention with reference to the drawings, and the technical scope of the present invention is not limited by the meanings of the terms. The parts having the same reference numerals appearing in a plurality of drawings indicate the same or equivalent parts or members.

The exemplary embodiment described below is specific examples of the technical idea of the present invention, and the present invention is not limited to the following exemplary embodiment. The dimensions, materials, shapes, relative arrangements, and the like of the components described below are not intended to limit the scope of the present invention thereto but are intended for exemplification, unless specifically stated. The contents described in relation to one exemplary embodiment and example can be applied to other exemplary embodiments and examples. The sizes and positional relationships of members shown in the drawings may be exaggerated in order to clarify the explanation.

In the battery pack shown in the following drawings, a plurality of battery blocks is electrically connected and physically connected by a circuit board. In each of the battery blocks, a plurality of battery cells is arranged at fixed positions by a holder, and the battery cells are connected by lead plates. In the battery blocks, terminal parts to be connected to the circuit board are arranged at the same position and are commonized. The circuit board is provided with connection parts that connect and couple the terminal parts of the battery blocks. In the battery pack, the terminal parts of the battery blocks are connected to the connection parts of the circuit board so that the plurality of battery blocks is connected in series or in parallel.

Figure 1:
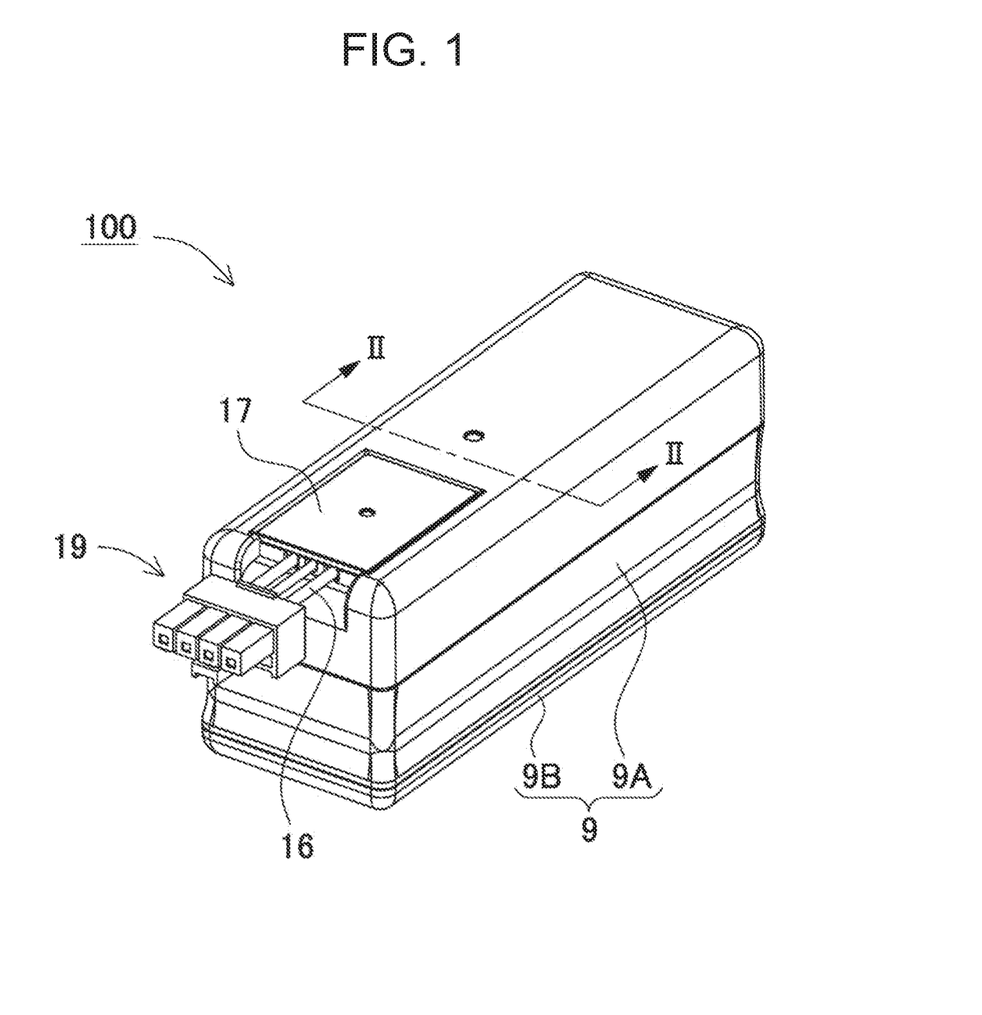
FIG. 1 is a perspective view of a battery pack according to an exemplary embodiment of the present invention.
Figure 2:
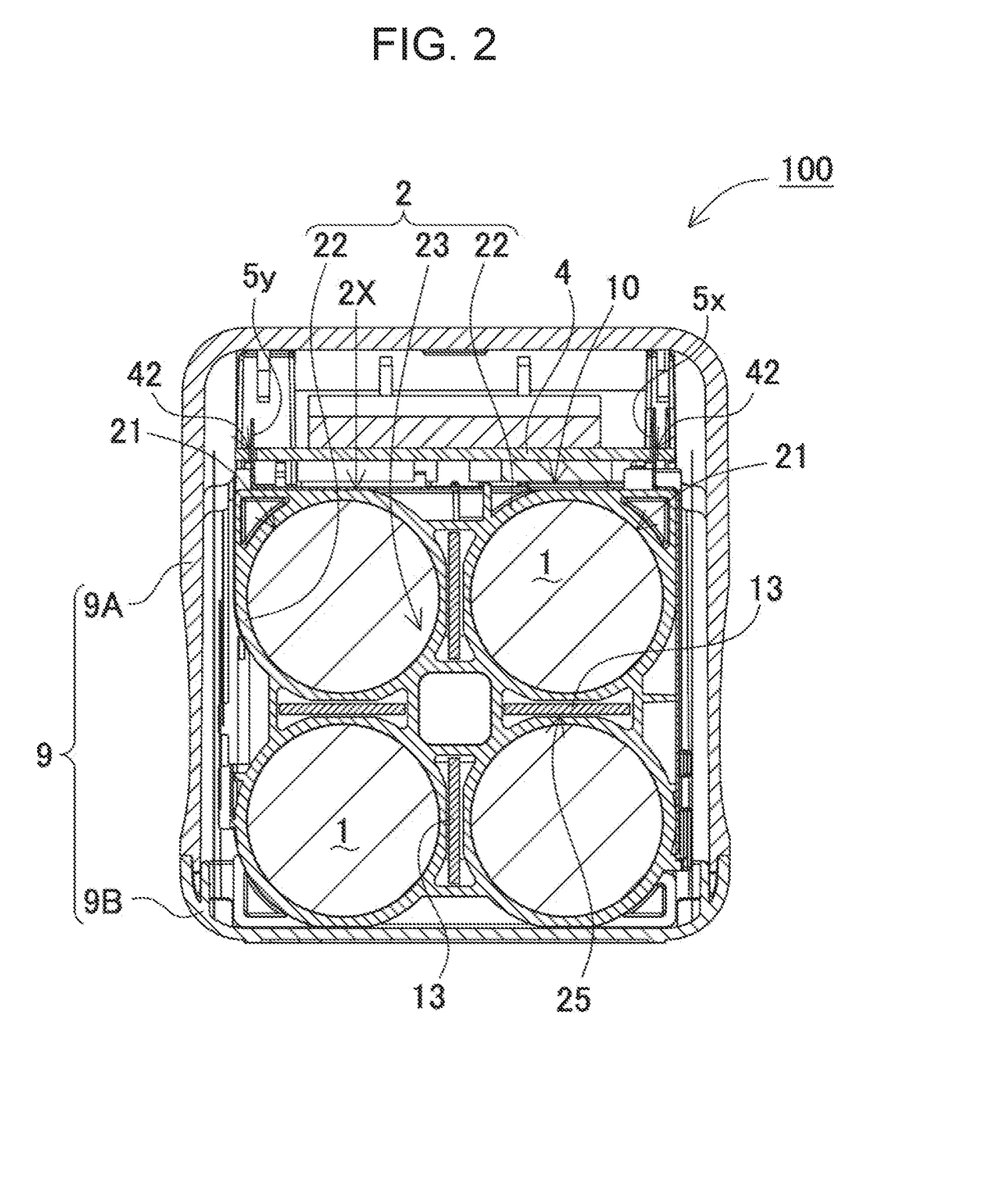
FIG. 2 is a cross-sectional view of the battery pack shown in FIG. 1 taken along line II-II.
Figure 3:
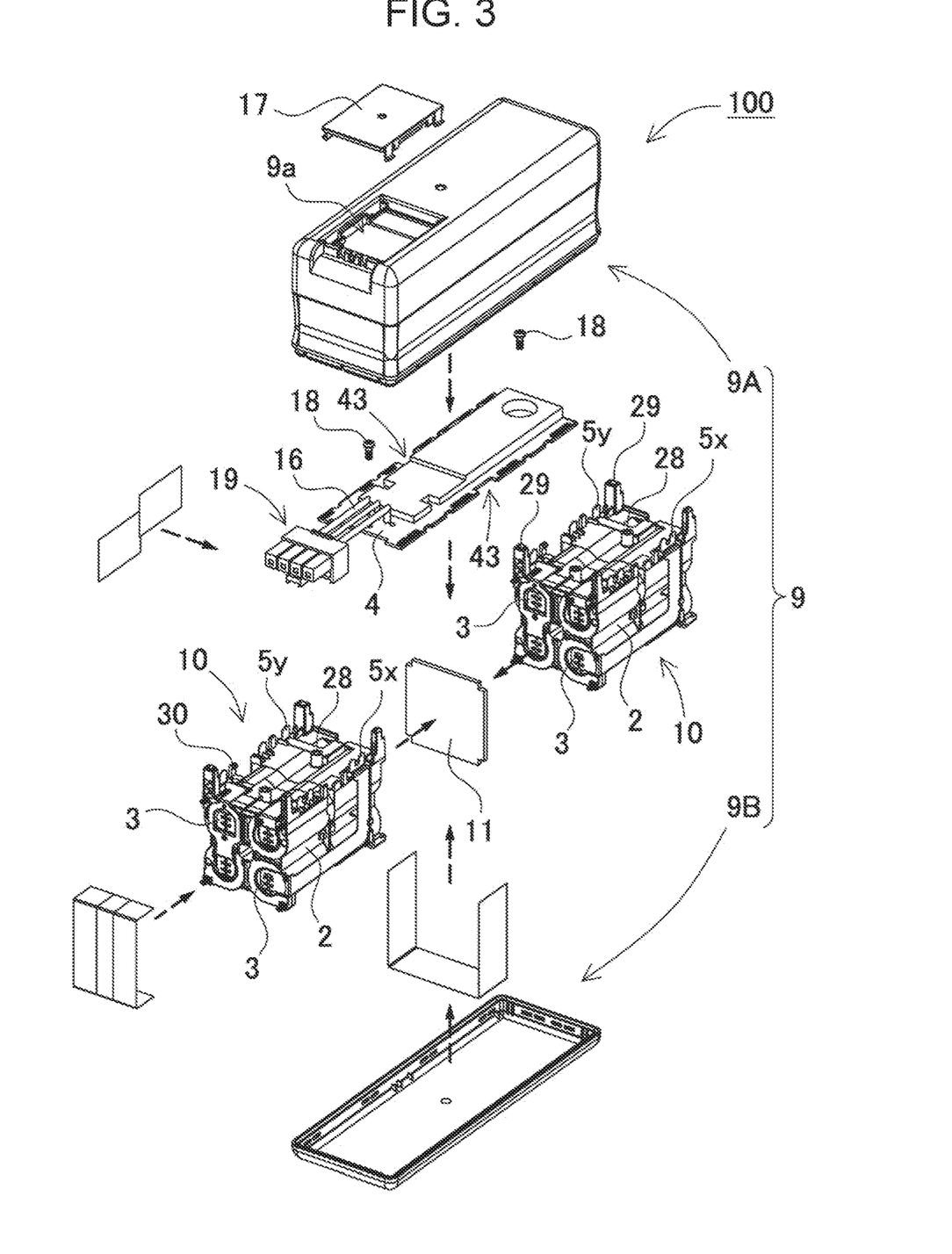
FIG. 3 is an exploded perspective view of the battery pack shown in
FIG. 1.
Figure 4:
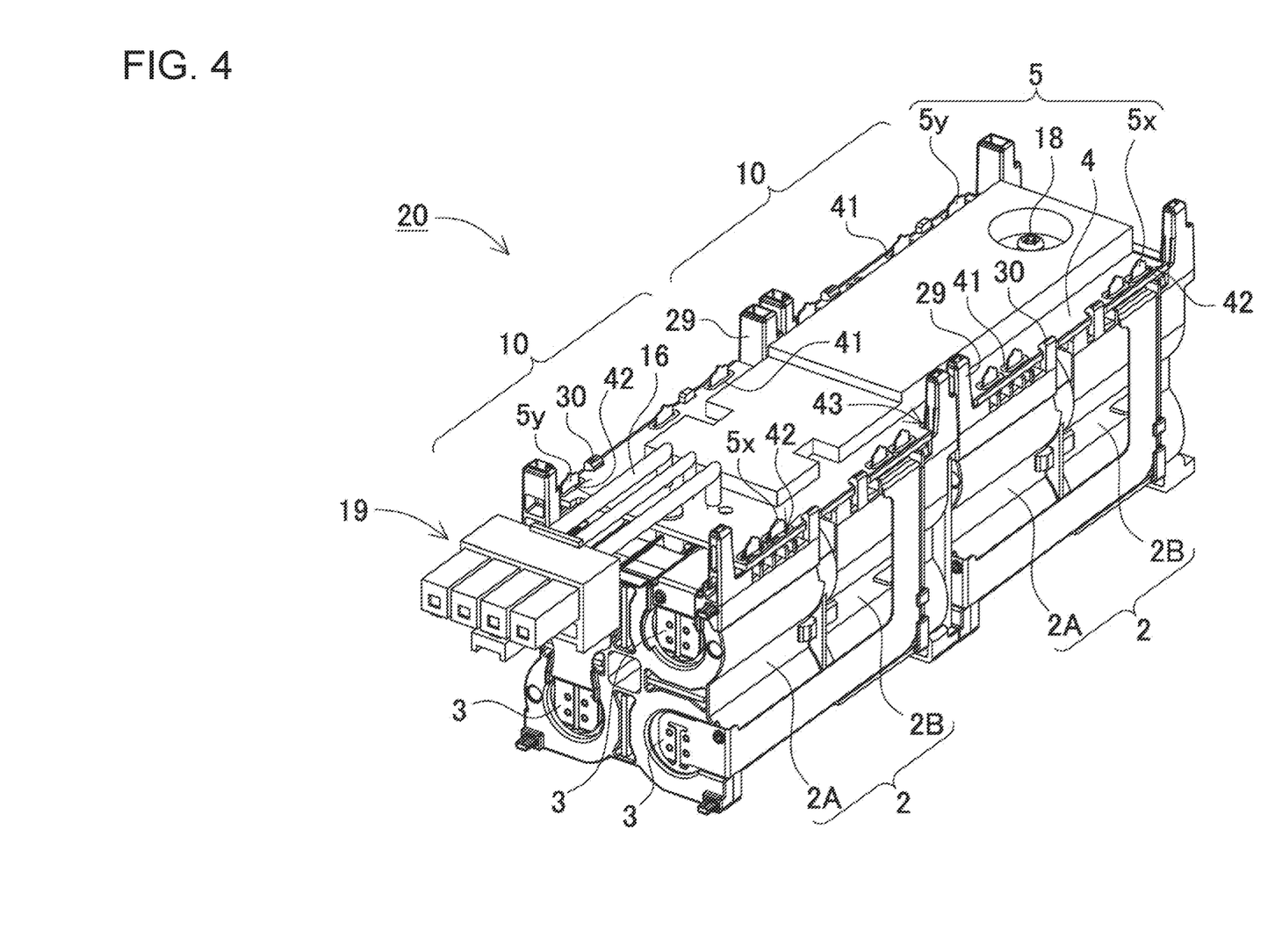
FIG. 4 is a perspective view of a core pack in which two battery blocks and a circuit board are coupled.
Figure 5:
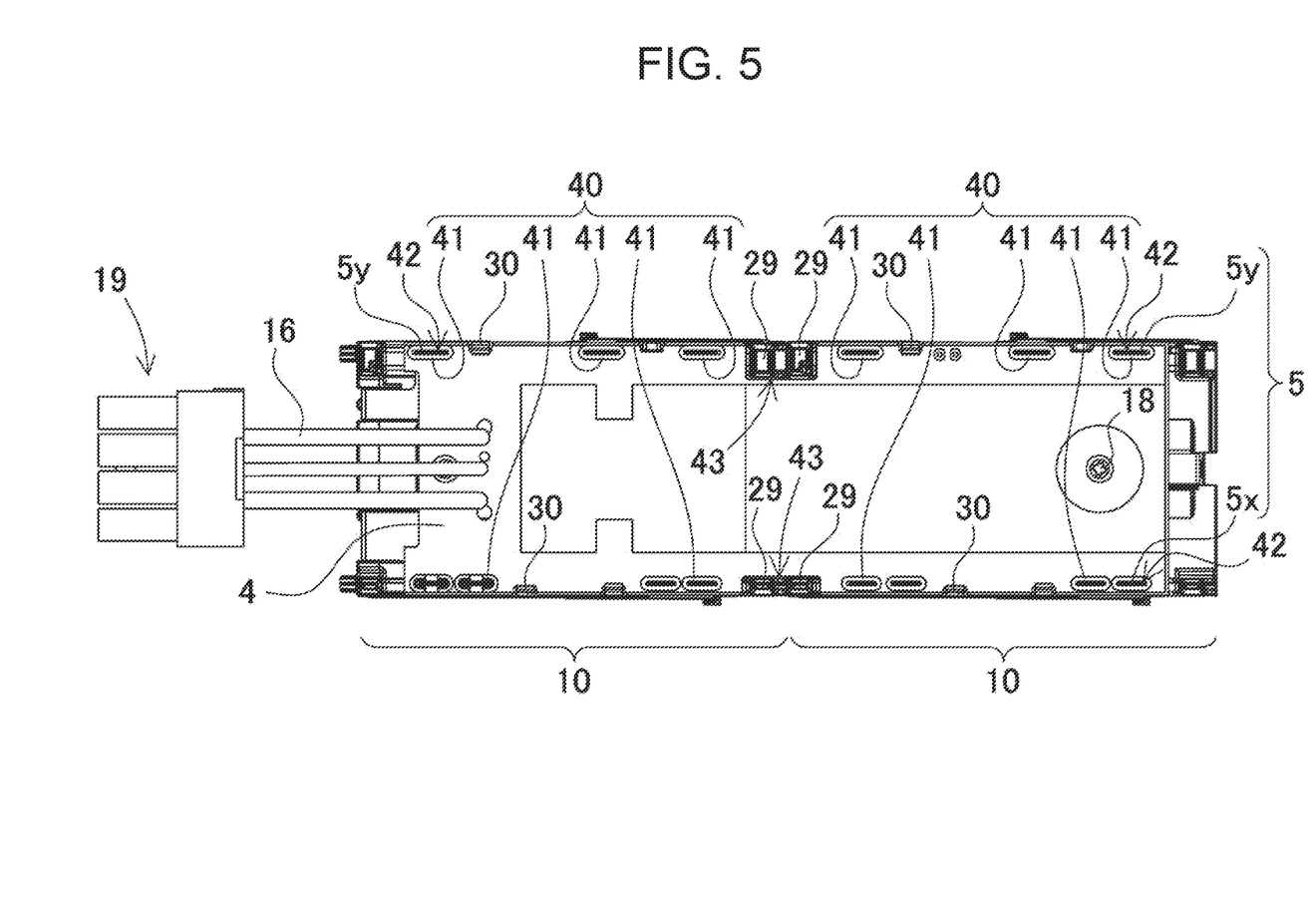
FIG. 5 is a plan view of the core pack shown in FIG. 4.
Figure 6:
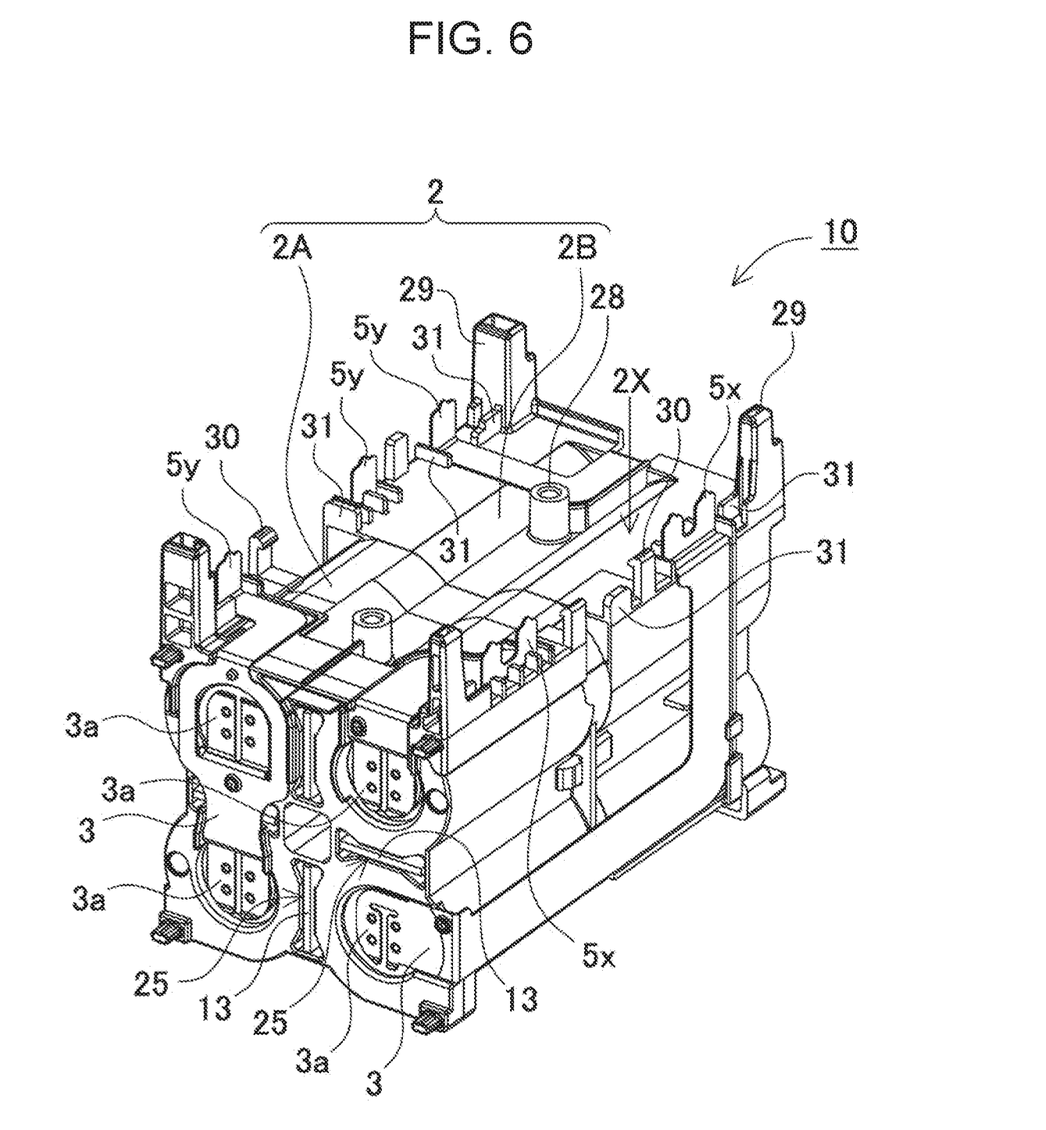
FIG. 6 is a perspective view of the battery block.
Figure 7:
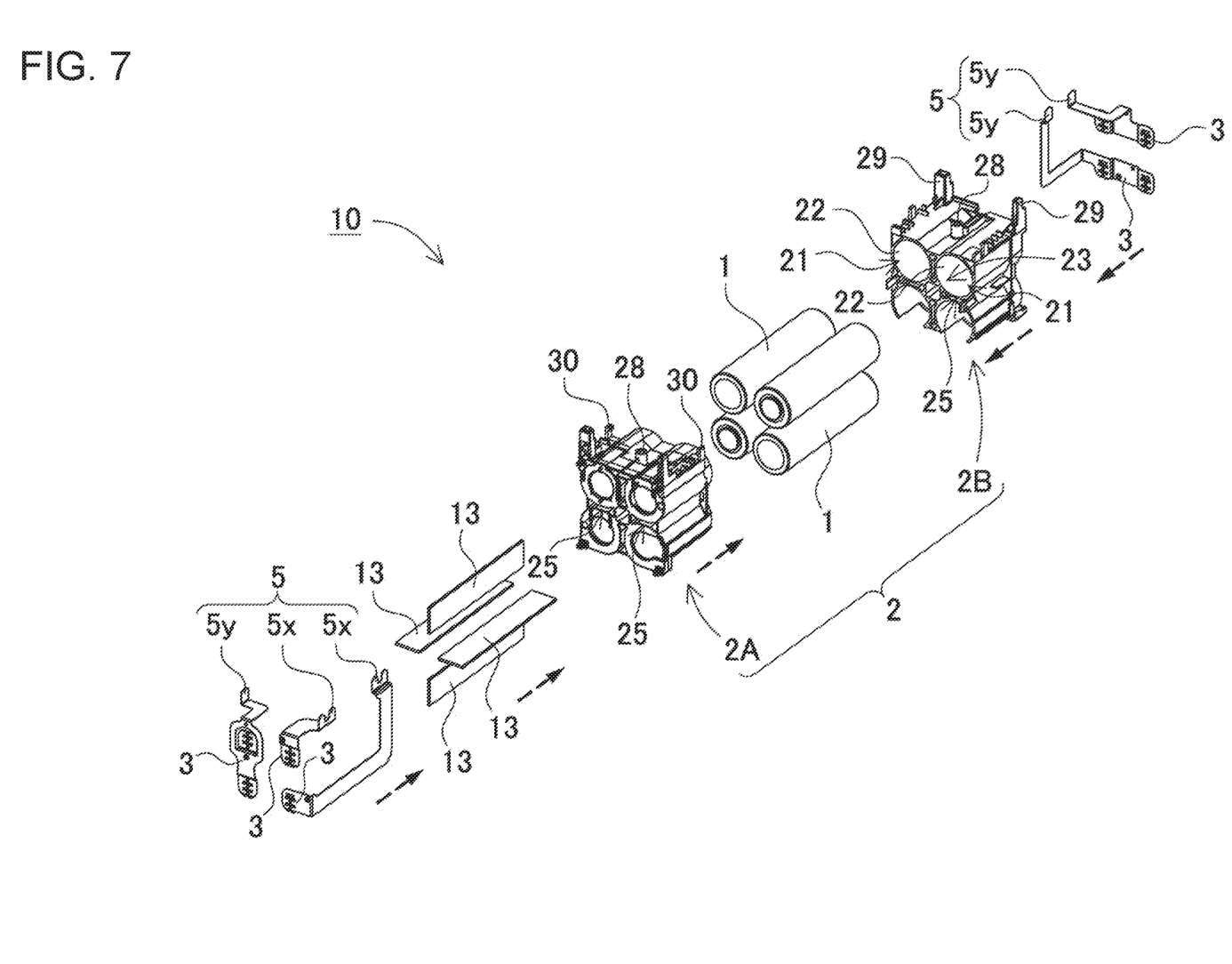
FIG. 7 is an exploded perspective view of the battery block shown in
FIG. 6.

FIGS. 1 to 7 show a battery pack according to one exemplary embodiment of the present invention. FIG. 1 is a perspective view of the battery pack, FIG. 2 is a vertical cross-sectional view of the battery pack, and FIG. 3 is an exploded perspective view of the battery pack. FIGS. 4 and 5 are respectively a perspective view and a plan view of a core pack in which battery blocks and a circuit board contained in a battery pack are coupled, and FIGS. 6 and 7 are respectively a perspective view and an exploded perspective view of the battery block.

Battery pack 100 includes a plurality of battery blocks 10 and circuit board 4. In the battery pack of FIG. 3, two battery blocks 10 are coupled to circuit board 4. The battery pack of the present invention is not specific to two battery blocks 10, but three or more battery blocks 10 can be coupled to circuit board 4 although not shown. Battery block 10 includes a plurality of battery cells 1 and holder 2 in which battery cells 1 are arranged in a parallel posture. In the battery pack of FIG. 3, two battery blocks 10 are coupled to circuit board 4 and housed in exterior case 9.

Battery pack 100 is used, for example, as a power source for a mobile device such as a vacuum cleaner. However, the present invention does not specify a mobile device for which the battery pack is to be used. The battery pack is also applicable to other mobile devices such as an electric tool and an assisted bicycle, for example. The battery pack shown in the drawings is structured to be detachably coupled to a portable device. However, the battery pack of the present invention can also be used by being incorporated in a portable device in a non-detachable state.

(Exterior Case 9)

Battery pack 100 is formed in a rectangular tubular box shape as shown in FIGS. 1 to 3. Exterior case 9 shown in the drawings is divided into two parts, case body 9A and lid part 9B. Exterior case 9 has connector 19 drawn to the outside for connecting with a portable device that is to be supplied power from battery pack 100. Exterior case 9 is made of a material having excellent electrical insulating properties and thermal insulating properties, for example, resin such as polycarbonate.

Exterior case 9 stores, as shown in FIG. 3, two battery blocks 10, insulating plate 11 disposed between battery blocks 10, and circuit board 4 coupling battery blocks 10. As shown in FIGS. 6 and 7, battery block 10 has a plurality of battery cells 1 arranged in a parallel posture in holder 2. In illustrated battery block 10, four battery cells 1 are arranged in two rows and two stages in holder 2. Battery cell 1 uses a cylindrical battery having a cylindrical exterior can. In illustrated battery block 10, four battery cells 1 are arranged in two rows and two stages, and battery cells 1 are connected in series by lead plates 3. In battery block 10 shown in the drawings, four battery cells 1 are arranged in two rows and two stages and connected in series. However, a number and connection form of battery cells 1 can be freely changed.

Battery cell 1 is a lithium ion secondary battery. However, battery cell 1 can be a non-aqueous electrolyte secondary battery other than a lithium-ion secondary battery. The cylindrical battery cell may be a rechargeable secondary battery such as a nickel metal hydride battery or a nickel cadmium battery, especially a battery that generates heat at high temperatures when being used.

(Insulating Plate 11)

As shown in FIG. 3, exterior case 9 has insulating plate 11 disposed between battery blocks 10. Insulating plate 11 is disposed between battery blocks 10 arranged side by side in a longitudinal direction of exterior case 9. This insulating plate 11 is an inorganic plate made from a material having excellent insulating properties and heat insulating properties such as a mica plate.

(Battery Block 10)

In battery block 10, four battery cells 1 are arranged at fixed positions in plastic holder 2, and battery cells 1 are connected in series by lead plates 3. In battery block 10 shown in FIGS. 6 and 7, battery cells 1 are connected in series by lead plates 3 to increase an output voltage. However, battery block 10 may have battery cells 1 connected in parallel by lead plates 3 or may have battery cells 1 connected in series and in parallel by lead plates 3. Although a plurality of battery blocks 10 is connected to circuit board 4, battery blocks 10 can be commonized by arranging battery cells 1 of the same outer shape, for example, cylindrical batteries of the same dimensions, at fixed positions in holder 2 of the same shape and connecting battery cells 1 by lead plates 3 of the same shape. Battery blocks 10 in which all the components are commonized can be mass-produced particularly inexpensively.

Battery block 10 is provided with protruding terminal parts 5 for connecting to circuit board 4. In battery blocks 10, terminal parts 5 are arranged at the same position and are commonized. Battery blocks 10 of FIGS. 4 to 7 are each provided with five terminal parts 5 including positive and negative output terminals 5x and three voltage detection terminals 5y. With five terminal parts 5 coupled to connection parts 41 of circuit board 4, one battery block 10 is connected to circuit board 4. In this circuit board 4, as shown in FIG. 5, connection parts 41 provided at five locations are used as one connection part unit 40, and one battery block 10 is coupled to one connection part unit 40. In the battery pack shown in the drawing, since two battery blocks 10 are coupled to circuit board 4, circuit board 4 has two connection part units 40, that is, connection parts 41 at the five locations as one connection part unit 40, in total, connection parts 41 at ten locations in two connection part units 40. Each connection unit 40 has a plurality of connection parts 41 arranged at the same position to couple terminal parts 5 of corresponding battery block 10. In the battery pack shown in the drawing, since two battery blocks 10 are coupled, circuit board 4 is provided with two connection part units 40 to couple terminal parts 5 of two battery blocks 10. In the battery pack, three or more battery blocks 10 can be coupled to circuit board 4. Three or more battery blocks 10 may be connected in series via circuit board 4 or connected in parallel, or four or more battery blocks 10 may be coupled to circuit board 4 and connected in series and in parallel.

Circuit board 4 shown in the drawing has through-holes 42 into which terminal parts 5 are to be inserted, and opening edge parts of through-holes 42 serve as connection parts 41 for terminal parts 5. In circuit board 4, terminal parts 5 are inserted into the through-holes and soldered so that terminal parts 5 are coupled to connection parts 41. Terminal parts 5 inserted into through-holes 42, soldered and coupled to connection parts 41 are electrically connected to circuit board 4 in an ideal state and physically coupled.

(Holder 2)

In holder 2 of FIGS. 6 and 7, the plurality of battery cells 1 is arranged in a parallel posture with terminal surfaces at both ends arranged on the same plane. Holder 2 has the plurality of battery cells 1 arranged in multiple stages and multiple rows. Holder 2 shown in the drawing is molded from plastic into a shape having holding tubes 22 in which four battery cells 1 are arranged at fixed positions. Holder 2 has a shape in which four holding tubes 22 are coupled in a parallel posture in two rows and two stages, and insides of holding cylinders 22 are substantially equal to outer shapes of battery cells 1 to form holding portion 21.

Holder 2 shown in the perspective view of FIG. 6 has fitting convex parts 29 projecting from fixed surface 2X (upper surface in the drawing) facing circuit board 4. Fitting convex parts 29 are hollow columnar bosses that vertically project upward from four corners of fixed surface 2X, and are molded integrally with the plastic of holder 2. Fitting convex parts 29 are formed in a tapered shape with an upper constriction, and guide fitting concave parts 43 provided in circuit board 4 to dispose circuit board 4 at a fixed position as shown in FIG. 4. Holder 2 shown in FIG. 6 further has mounting ribs 31 integrally molded for mounting circuit board 4 thereon at a plurality of positions on fixed surface 2X and specifying vertical position of circuit board 4. Mounting ribs 31 are provided at a plurality of positions on both sides of fixed surface 2X of holder 2, and circuit board 4 is mounted thereon and disposed at a fixed position. Battery blocks 10 of FIG. 6 has locking hooks 30 for circuit board 4 integrally molded and provided on fixed surface 2X of holder 2. As shown in FIG. 4, locking hooks 30 lock circuit board 4 set at a fixed position and disposes it at the fixed position. In circuit board 4, terminal parts 5 of battery blocks 10 are inserted into through-holes 42 of circuit board 4, fitting convex parts 29 of holder 2 are guided to fitting concave parts 43, and a bottom surface is mounted on mounting ribs 31, disposed at a fixed position, and locked by locking hooks 30, so that circuit board 4 is disposed at the fixed position. With circuit board 4 set at the fixed position by locking hooks 30, terminal parts 5 of battery blocks 10 are soldered to connection parts 41 of circuit board 4 to couple battery blocks 10.

Battery block 10 shown in FIG. 7 has holder 2 divided into first holder 2A and second holder 2B in the longitudinal direction of battery cells 1. Holder 2 allows smooth insertion of elongated battery cells 1. First holder 2A and second holder 2B are separately manufactured by molding plastic, and battery cells 1 are inserted and coupled to each other. First holder 2A and second holder 2B each have cylindrical holding tubes 22 for inserting cylindrical battery cells 1 and arranging the same at fixed positions. An inner shape of each of holding tubes 22 is substantially the same as an outer shape of battery cell 1, and to be exact, the inner shape of each of holding tubes 22 is slightly larger to smoothly insert and arrange battery cells 1 at fixed positions. First holder 2A and second holder 2B of this structure are coupled to each other at fixed positions with battery cells 1 therebetween in a state where both ends of cylindrical battery cells 1 are inserted. First holder 2A and second holder 2B can be more accurately coupled to each other with opposing surfaces as a fitting structure, and are also coupled together at fixed positions with a non-melting plate described later. First holder 2A and second holder 2B, which are coupled via battery cells 1, are coupled to circuit board 4 and are held in a mutually coupled state.

Battery block 10 shown in FIGS. 2 and 7 has holding tubes 22 disposed between adjacent battery cells 1 as partition walls 23, and non-melting plates 13 such as mica plates disposed inside partition walls 23. In illustrated holder 2, since battery cells 1 are arranged in two rows and two stages, cross-shaped partition wall 23 is provided between the four sets of battery cells 1 arranged vertically and horizontally. Partition walls 23 are provided with insertion gaps 25 into which non-melting plates 13 inside are to be inserted. Partition walls 23 have non-melting plates 13 such as mica plates inserted in insertion gaps 25. This battery block 10 can prevent thermal runaway from being induced in adjacent battery cells 1 while any one of battery cells 1 causes thermal runaway and generates abnormal heat.

(Lead Plates 3)

Figure 8:
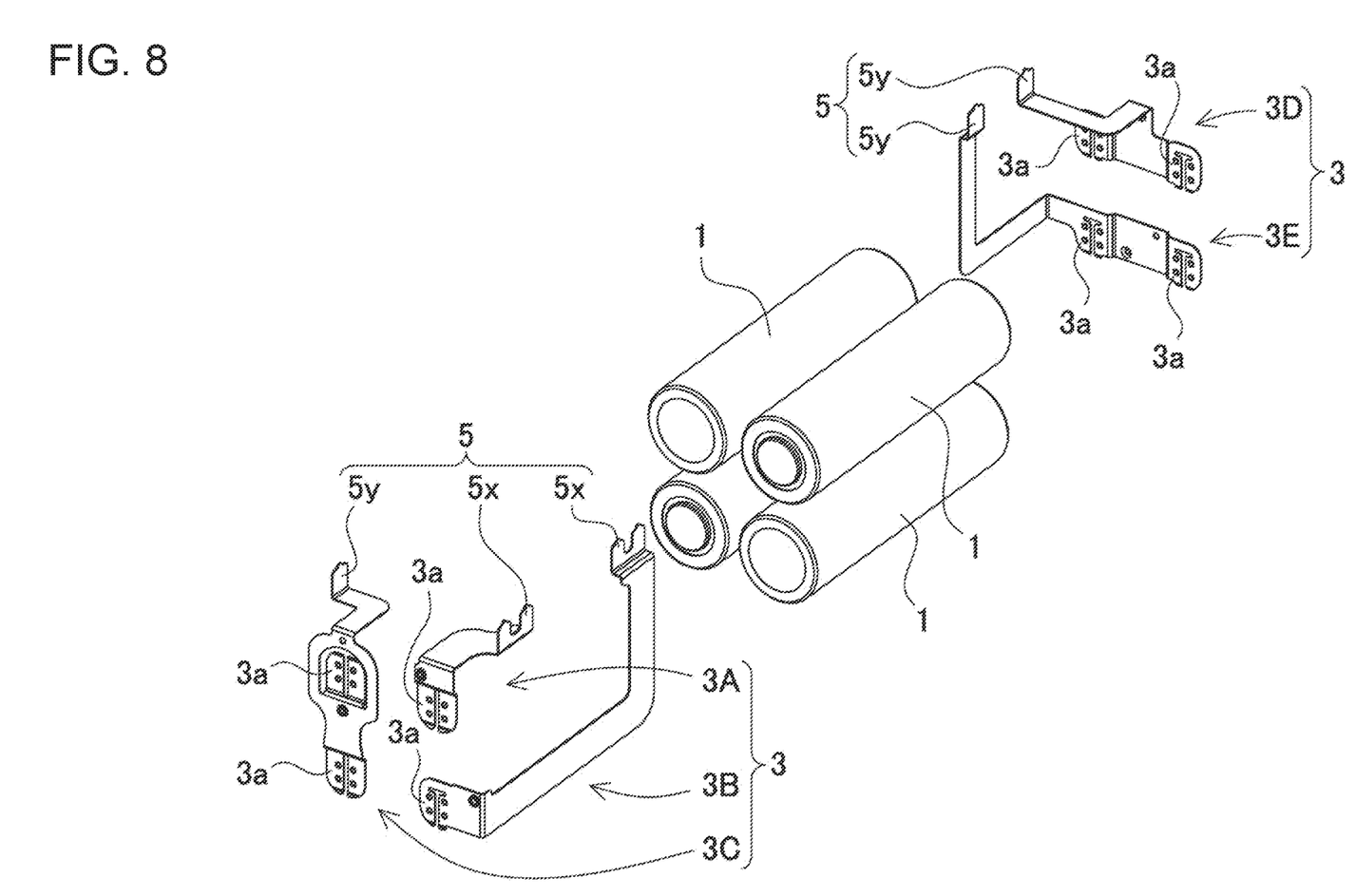
FIG. 8 is an exploded perspective view of a battery cell and lead plates in a connected state.

Battery cells 1 of battery blocks 10 are electrically connected in series by lead plates 3. Lead plate 3 is formed by bending a metal plate having excellent conductivity. Lead plates 3 are welded and fixed to electrodes provided on the end surfaces of battery cells 1. FIG. 8 shows a state where lead plates 3 connect battery cells 1 in one battery block 10. This drawing shows a state in which lead plates 3 are separated from battery cells 1 and holder 2 is removed in order to make a connection state of lead plates 3 easy to understand. Although this drawing shows one battery block 10, battery blocks 10 connected to circuit board 4 have battery cells 1 connected in the same state by lead plates 3 of the same shape.

As shown in FIG. 8, battery blocks 10 has four battery cells 1 connected in series by five lead plates 3 and has output terminals 5x provided by lead plates 3. Five lead plates 3 have welded parts 3a provided on the electrodes of battery cells 1. Welded parts 3a is provided with welding spots on both sides of a slit in order to reduce reactive current in spot welding. The welding spots are projected and fixed by spot welding to the electrodes of battery cells 1. Battery block 10 includes first to fifth lead plates 3. First lead plate 3A and second lead plate 3B each have one end as welded part 3a and the other end as output terminal 5x of battery block 10. Third lead plate 3C, fourth lead plate 3D, and fifth lead plate 3E are each provided with a pair of welded parts 3a and voltage detection terminal 5y. The pair of welded parts 3a are connected to the electrodes of adjacent battery cells 1 and connect adjacent battery cells 1 in series. Output terminals 5x and voltage detection terminals 5y provided at end parts of lead plates 3 are arranged at fixed positions in holder 2. With welded parts 3a fixed to the electrodes of battery cells 1, output terminals 5x and voltage detection terminals 5y project from fixed surface 2X of battery block 10.

Battery block 10 shown in FIGS. 6 to 8 is provided with terminal parts 5 at the end parts of lead plates 3. Battery block 10 is coupled to circuit board 4 by soldering terminal parts 5 provided at the end parts of lead plates 3 to circuit board 4. In battery block 10 of FIG. 6, output terminals 5x of battery block 10 are disposed on one side of holder 2, and voltage detection terminals 5y for detecting the voltage of battery cells 1 are disposed on the other side. As shown in FIGS. 4 and 5, battery blocks 10 are each physically coupled to circuit board 4 by coupling terminal parts 5 including output terminals 5x and voltage detection terminals 5y to circuit board 4. Battery blocks 10 with terminal parts 5 on both sides coupled to circuit board 4 are stably coupled to circuit board 4.

(Circuit Board 4)

Circuit board 4 couples the plurality of battery blocks 10, electrically connect battery blocks 10, and further physically couples battery blocks 10. In battery pack 100 shown in the exploded perspective view of FIG. 3, circuit board 4 is screwed to two battery blocks 10 with set screws 18 penetrating circuit board 4 to further firmly couple the plurality of battery blocks 10. Battery blocks 10 each have fixing bosses 28 into which set screws 18 are to be screwed on fixed surface 2X of holder 2. Output terminals 5x of each battery block 10 are connected via circuit board 4 and further connected to connector 19. Circuit board 4 is provided with a conductive layer (not shown) such as a copper foil on its surface. The conductive layer electrically connects connection parts 41 for output terminals 5x to connect battery blocks 10 in series, and also connects output terminals 5x to lead wire 16 of the connector 19. The conductive layer further connects connection parts 41 for the voltage detection terminals 5y to a protection circuit of circuit board 4. Circuit board 4 is mounted with the protection circuit that charges and discharges battery cells 1, and connects each battery cell 1 to the protection circuit. The protection circuit detects the voltage and current of each battery cell 1 and controls the current for charging/discharging to protect the battery while charging/discharging.

Battery pack 100 described above is assembled in the following steps.

(1)

Battery cells 1 and non-melting plates 13 are arranged and coupled at fixed positions in first holder 2A and second holder 2B. First holder 2A and second holder 2B are coupled in a state where battery cells 1 are inserted into corresponding holding parts 21 and non-melting plates 13 are inserted into corresponding insertion gaps 25 of partition wall 23. First holder 2A and second holder 2B are coupled by a locking structure, and are also coupled at fixed positions via built-in battery cells 1 and non-melting plates 13.

(2)

Lead plates 3 are connected to end surface electrodes of battery cells 1 exposed from both end surfaces of holder 2 so that all battery cells 1 housed in holder 2 are connected in series. Lead plates 3 are electrically connected and fixed by welding to the end surface electrodes of battery cells 1.

Battery block 10 is manufactured through the above steps.

(3)

Two battery blocks 10 are coupled with insulating plate 11 sandwiched therebetween. Two battery blocks 10 are arranged side by side in the axial direction of battery cells 1, and are insulated by insulating plate 11 interposed therebetween.

(4)

Circuit board 4 is coupled to two battery blocks 10. Holder 2 shown in FIGS. 3 to 6 includes fitting convex parts 29 on an upper surface, and fitting convex parts 29 are guided to fitting concave parts 43 provided on an outer peripheral edge of circuit board 4 to dispose circuit board 4 at a fixed position. In holder 2 shown in the diagrams, circuit board 4 is locked at locking hooks 30 protruding from the upper surface and coupled at the fixed position by the locking structure. Circuit board 4 is fixed to holder 2 by screwing set screws 18 penetrating circuit board 4 into fixing bosses 28 provided on the upper surface of holder 2.

(5)

Terminal parts 5 drawn out from lead plates 3 are electrically connected to circuit board 4 coupled to battery blocks 10. Terminal parts 5 are disposed in a state of protruding from fixed surface 2X of holder 2 which is the upper surface of battery blocks 10, are inserted into through-holes 42 provided in circuit board 4 and disposed at fixed positions, electrically connected to connection parts 41 by soldering, and physically coupled to circuit board 4.

In the above state, as shown in FIG. 6, battery core pack 20 in which circuit board 4 is coupled to two battery blocks 10 is manufactured.

(6)

Battery core pack 20 is stored in exterior case 9. Circuit board 4 shown in the diagram is connected to output connector 19. Battery core pack 20 is stored in case body 9A of exterior case 9 such that connector 19 passes through open window 9a in case body 9A, and then case body 9A is closed with lid part 9B. Then, open window 9a of case body 9A is closed by closure lid 17.

In battery pack 100 described above, battery cells 1 of each battery block 10 are connected in series by lead plates 3 to increase an output voltage of battery block 10. However, battery block 10 may have battery cells 1 connected in parallel or in series and in parallel by lead plates 3. In the battery pack described above, battery blocks 10 are connected in series to increase the output voltage. However, battery blocks 10 may be connected in parallel to increase a current capacity, three or more battery blocks 10 may be coupled to circuit board 4 and connected in series or in parallel, or four or more battery blocks 10 may be coupled and connected in series and in parallel.

INDUSTRIAL APPLICABILITY

The battery pack of the present invention is suitably used as a power source for portable devices such as vacuum cleaners, electric power tools, and assisted bicycles.

REFERENCE MARKS IN THE DRAWINGS 100 battery pack
1 battery cell
2 holder
2A first holder
2B second holder
2X fixed surface
3 lead plate
3A first lead plate
3B second lead plate
3C third lead plate
3D fourth lead plate
3E fifth lead plate
3a welded part
circuit board
terminal part
5x output terminal
5y voltage detection terminal
9 exterior case
9A case body
9a open window
9B lid part
10 battery block
11 insulating plate
13 non-melting plate
16 lead wire
17 closure lid
18 set screw
19 connector
20 core pack
21 holding part
22 holding tube
23 partition wall
25 insertion gap
28 fixing boss
29 fitting convex part
30 locking hook
31 mounting rib
40 connection part unit
41 connection part
42 through-hole
43 fitting concave part

The invention claimed is:
1. A battery pack comprising:
a plurality of battery blocks, each battery block of the plurality of battery blocks including a plurality of battery cells arranged at fixed positions by a holder, the plurality of battery cells being connected together by lead plates; and a circuit board to which the plurality of battery blocks are fixed, wherein each of the plurality of battery blocks have terminal parts to be connected to the circuit board, the circuit board has connection parts, one of connection parts being connected to a corresponding one of the terminal parts of the each of the plurality of battery blocks to connect by coupling the terminal parts of the each of the plurality of battery blocks to the connection parts of the circuit board, the plurality of battery blocks in series or in parallel, and the plurality of battery blocks are coupled via the circuit board, wherein the terminal parts include output terminals of the plurality of battery blocks and voltage detection terminals that detect a voltage of the plurality of battery cells of a corresponding battery block of the plurality of battery blocks, the output terminals being connected to corresponding connection parts of the circuit board different from the voltage detection terminals connection to the connection parts of the circuit board, wherein the plurality of battery blocks includes:

a first battery block that has a first pair of output terminals common to all the plurality of battery cells included in the first battery block, and a second battery block that has a second pair of output terminals common to all the plurality of battery cells included in the second battery block, wherein the circuit board includes a single circuit board configured to connect with the first pair of output terminals and the second pair of output terminals, so as to electrically and physically interconnect the first battery block and the second battery block via the single circuit board, the plurality of battery cells are arranged parallel to each other so as to have end surfaces thereof facing in a first direction, and side surfaces thereof facing in a second direction perpendicular to the first direction, and each of the lead plates has one, proximal end thereof attached to an end of the plurality of battery cells in the first direction, and another, distal end thereof terminating in a corresponding one of the output terminals and the voltage detection terminals, wherein an intermediate portion between the proximal and distal ends of the lead plate extends along the side surfaces of the plurality of battery cells.

2. The battery pack according to claim 1, wherein, in each of the plurality of battery blocks coupled to the circuit board, the plurality of battery cells have a same outer shape, are arranged at fixed positions by the holder having a same shape as another of the plurality of battery blocks, and are connected by the lead plates having a same shape.

3. The battery pack according to claim 1, wherein each terminal part of the terminal parts is provided on a corresponding lead plate of the lead plates.

4. The battery pack according to claim 1, wherein each terminal part of the terminal parts of the plurality of battery cells is soldered and coupled to a corresponding connection part of the connection parts of the circuit board.

5. The battery pack according to claim 1, wherein
the holder has terminal surfaces at both ends arranged on a same plane to arrange corresponding adjacent battery cells of the plurality of battery cells in parallel, and
the circuit board has a shape elongated in a longitudinal direction of the plurality of battery cells, and the plurality of battery blocks are arranged side by side in a longitudinal direction of the circuit board.

6. The battery pack according to claim 5, wherein each of the plurality of battery blocks has the plurality of battery cells arranged in the longitudinal direction of the circuit board.

7. The battery pack according to claim 1, wherein
each of the plurality of battery blocks has the terminal parts protruding from a fixed surface facing the circuit board,
the connection parts of the circuit board include through-holes for inserting the terminal part, and
the terminal parts are inserted into the through-hole and coupled to the connection parts.

8. The battery pack according to claim 7, wherein
the holder has a locking hook integrally molded for the circuit board, and
with the terminal parts inserted into the through-hole provided in the circuit board, the locking hook locks and disposes the circuit board at a fixed position.

9. The battery pack according to claim 1, wherein
each of the plurality of battery block has the terminal parts on both sides of the holder, and
the terminal parts on the both sides are coupled to the circuit board.

10. The battery pack according to claim 9, wherein the each of the plurality of battery blocks has the terminal parts, the terminal parts including a first terminal part that is an output terminal disposed on one side of the holder and a second terminal part that is a voltage detection terminal disposed on another side of the holder.

11. The battery pack according to claim 1, wherein
the holder has a fitting convex part on the fixed surface facing the circuit board,
the circuit board has a fitting concave part that guides the fitting convex part, and
the fitting convex part is guided by the fitting concave part so that the plurality of battery block is coupled to the circuit board at a fixed position.

* * * * *